(12) United States Patent
Eichelmann et al.

(10) Patent No.: US 11,162,536 B2
(45) Date of Patent: Nov. 2, 2021

(54) SEALING ARRANGEMENT OF A WHEEL BEARING

(71) Applicant: SCHAEFFLER TECHNOLOGIES AG & CO. KG, Herzogenaurach (DE)

(72) Inventors: Frank Eichelmann, Donnersdorf (DE); Jakob Rutz, Hambach (DE); Andreas Kaiser, Werneck (DE); Christian Mock, Schweinfurt (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 384 days.

(21) Appl. No.: 16/088,517

(22) PCT Filed: Jan. 25, 2017

(86) PCT No.: PCT/DE2017/100047
§ 371 (c)(1),
(2) Date: Sep. 26, 2018

(87) PCT Pub. No.: WO2017/167325
PCT Pub. Date: Oct. 5, 2017

(65) Prior Publication Data
US 2020/0300304 A1 Sep. 24, 2020

(30) Foreign Application Priority Data

Mar. 30, 2016 (DE) .......................... 102016205181.4

(51) Int. Cl.
*F16C 33/72* (2006.01)
*F16C 33/78* (2006.01)

(52) U.S. Cl.
CPC ........ *F16C 33/726* (2013.01); *F16C 33/7876* (2013.01); *F16C 2326/02* (2013.01)

(58) Field of Classification Search
CPC ................ F16C 33/726; F16C 33/7816; F16C 33/7866; F16C 33/7876; F16C 33/7879
See application file for complete search history.

(56) References Cited

U.S. PATENT DOCUMENTS

| 3,572,379 A | * | 3/1971 | Popa ................... F16C 33/7813 137/849 |
| 4,552,467 A | | 11/1985 | Takei et al. |
| 2008/0247696 A1 | | 10/2008 | Winkelmann et al. |

FOREIGN PATENT DOCUMENTS

| CN | 2517903 Y | 10/2002 |
| CN | 103925297 A | 7/2014 |

(Continued)

OTHER PUBLICATIONS

International Search Report and Written Opinion for PCT/DE2017/100047, dated May 3, 2017, 5 pages.

(Continued)

*Primary Examiner* — James Pilkington
(74) *Attorney, Agent, or Firm* — Dickinson Wright PLLC

(57) ABSTRACT

A sealing arrangement comprising a carrier element connecting to a first bearing part, wherein the carrier element further includes an elastic element that includes a sealing lip, and a cavity between the first bearing part and a second bearing part, wherein the cavity is delimited by the carrier element, wherein the carrier element includes at least one aperture at a radial level of the cavity and the at least one aperture is sealed by a diaphragm connected to the carrier element, wherein at least one protective lip is provided on an opposite side of the diaphragm, and wherein the at least one protective lip is formed at the elastic element.

13 Claims, 1 Drawing Sheet

(56) References Cited

FOREIGN PATENT DOCUMENTS

| | | |
|---|---|---|
| DE | 10312085 A1 | 9/2004 |
| DE | 102010055178 A1 | 6/2012 |
| DE | 102011076276 A1 | 11/2012 |
| JP | 2005121164 A | 5/2005 |
| JP | 2006207613 A | 8/2006 |
| JP | 2014040890 A | 3/2014 |
| WO | WO2006123795 | * 11/2006 |

OTHER PUBLICATIONS

Office Action for Chinese Application No. 201780019661.0, dated Jul. 1, 2019, 7 pages.

* cited by examiner

SEALING ARRANGEMENT OF A WHEEL BEARING

CROSS-REFERENCE TO RELATED APPLICATIONS

This application is the U.S. National Phase of PCT/DE2017/100047 filed Jan. 25, 2017, which claims priority to DE 102016205181.4 filed Mar. 30, 2016, the entire disclosures of which are incorporated by reference herein.

TECHNICAL FIELD

The disclosure relates to a sealing arrangement of a wheel bearing.

BACKGROUND

In order to achieve a long lifespan, wheel bearings of motor vehicles require double-sided sealings of the interior which are filled with lubricant and which contain the rolling bodies. To accomplish this, centrifugal sheets are used, which form a sealing labyrinth along with the sealing lips.

A sealed bearing arrangement is known from the DE 10 2010 055 178. The bearing arrangement features a sealing arrangement on both sides of the axial ends. This sealing arrangement consists of a sealing ring, features several apertures that are distributed along the circumference, which are sealed in a semipermeable manner by using a elastomer diaphragm and which form a gas channel.

SUMMARY

It is the objective of the present disclosure, to provide a sealing arrangement, which seals for the duration of the usage in both a secure manner, as well which ensures a ventilation system for a pressure compensation in the bearing.

In line with the disclosure, this task is accomplished by using a sealing arrangement of a wheel bearing with a first bearing part and with a second bearing part that is connected in one piece with a wheel bearing flange, between which rolling bodies are guided, wherein the sealing arrangement comprises the following:

a carrier element, which is connected to one of the two bearing parts and wherein an elastic element is provided on the carrier element, wherein the elastic element features at least one sealing lip, wherein a cavity is configured between the first bearing part and the second bearing part, which cavity is delimited by using the carrier element and/or the elastic element, and wherein the carrier element and/or the elastic element feature at least one aperture at the radial level of the cavity, and wherein the at least one aperture is sealed by way of a diaphragm, and wherein the diaphragm is connected directly and/or indirectly to the carrier element, wherein at least one protective lip is provided on the opposite side of the diaphragm, and wherein the a least one protective lip is formed at the elastic element and/or at the carrier element.

The sealing arrangement according to the disclosure features a diaphragm, which is connected directly and/or indirectly to the carrier element and which seals the at least one aperture. On the opposite side of the diaphragm, at least one protective lip is provided at the carrier element. This protective lip may be made of an elastomer. The protective lip is hereby either directly connected to the carrier element or the protective lip is formed by using the elastic element, which already forms the sealing lip. The purpose of the protective lip is to protect the diaphragm against contamination such a grease, oil, water and the like. Advantageously, two protective lips are intended, which are approximately arranged in a V-shape formation, in order to form a narrow gap. This narrow gap further ensures the function of the diaphragm and thereby the ventilation for a pressure equalization when temperature differences occur.

The at least one aperture that is provided in the carrier element can be designed as a bore hole, slot, or the like. If the carrier element features several apertures, these are arranged in a distributed manner along the circumference. The apertures can be provided e.g. in an evenly distributed manner and/or with a radial offset towards each other.

The carrier element can be formed in an L-, C- or S-shape. It may also be possible that the carrier element does not feature at least one sealing lip, but that it serves as a stop face for at least one sealing lip.

According to one alternative embodiment of the disclosure, the at least one protective lip is formed by using the elastic element. The advantage of this is that the protective lip can be additionally formed on the carrier element in one manufacturing step when the elastic element is applied, which in turn forms the at least one sealing lip. A separate manufacturing step would thus be avoided. Overall, a simple and cost-effective production is thus provided and ensured.

According to one embodiment of the disclosure, an air volume is provided between the diaphragm and the carrier element. By using the intended air volume it is ensured that a ventilation of the interior of the bearing can be carried out.

The air volume may be created by using a depression provided on the carrier element. The depression may be chamfered or the like. Such an embodiment of the disclosure serves to increase the active surfaces of the diaphragm. This has the result, that a larger portion of the surface of the diaphragm can be used for the ventilation.

According to one embodiment of the disclosure, the at least one aperture is drilled, punched, milled and/or lasered.

The carrier element may be manufactured out of a metal or plastic material. The stiffness of the sealing arrangement is thus ensured.

BRIEF DESCRIPTION OF THE DRAWINGS

In the following, two embodiments of the disclosure are depicted by means of two figures. It is shown.

DETAILED DESCRIPTION

Figure 1:
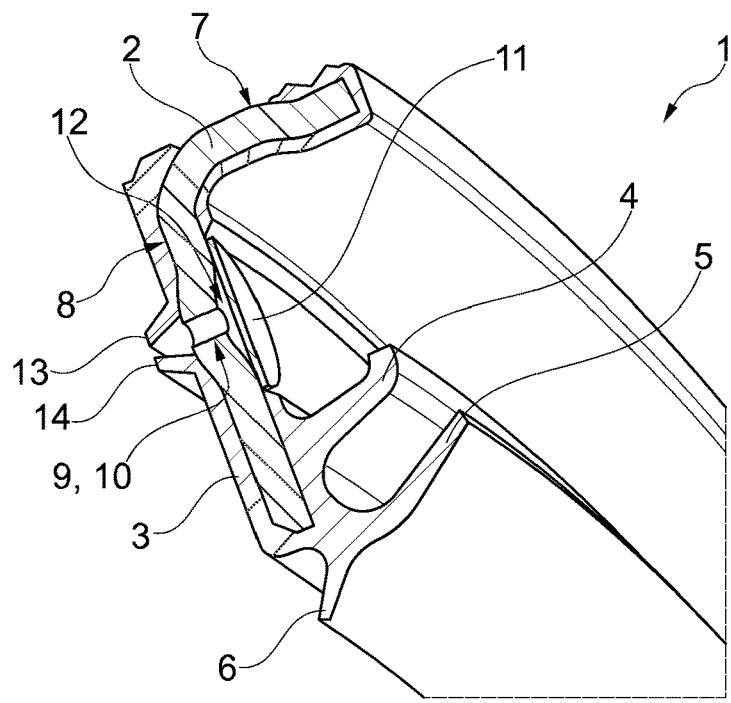
FIG. 1 a section from a sealing arrangement of a wheel bearing in line with the disclosure according to a first embodiment, FIG. 2 a section from a sealing arrangement of a wheel bearing in line with the disclosure according to a second embodiment.

FIG. 1 depicts a section of a sealing arrangement 1 according to the disclosure of a wheel bearing that is not shown in detail in accordance with a first embodiment.

The sealing arrangement 1 comprises a carrier element 2, which is formed in an L-shape and which features a first section 7 and a second section 8. By using the first section, carrier element 2 is connected to one of the bearing parts of the wheel bearing that are not shown in detail. An elastic element 3 is connected to carrier element 2. The elastic element 3 features three sealing lips 4, 5, 6 in this embodiment. These sealing lips 4, 5, 6 either lie against a further metal sheet or at one of the two bearing parts of the wheel bearing.

Second section 8 of carrier element 2 features at least one aperture 9. It is formed as a bore hole 10 with a constant diameter. Aperture 9 is sealed on one side of the second section by using a diaphragm 11. Diaphragm 11 is hereby directly connected to carrier element 2. The second section 8 features a depression 12 in the region of diaphragm 11, which creates an air volume between diaphragm 11 and carrier element 2. This causes an increase in the active surfaces of diaphragm 11.

Two protective lips 13, 14 surrounding the aperture are provided on the opposite side of diaphragm 11. The two protective lips 13, 14 are formed by using the elastic element 3 and are thus connected to the second section 8 of the carrier element. The protective lips 13, 14 run towards each other in a V-shape and thereby form a narrow gap in the direction of aperture 9. Such an arrangement ensures that diaphragm 11 is protected against contamination such as bearing oil or grease.

In the following, a second embodiment will be described with reference to FIG. 2. Identical components are referred to by the same reference signs as in the preceding FIG. 1. The description of FIG. 2 is thus limited to components that are different.

Figure 2:
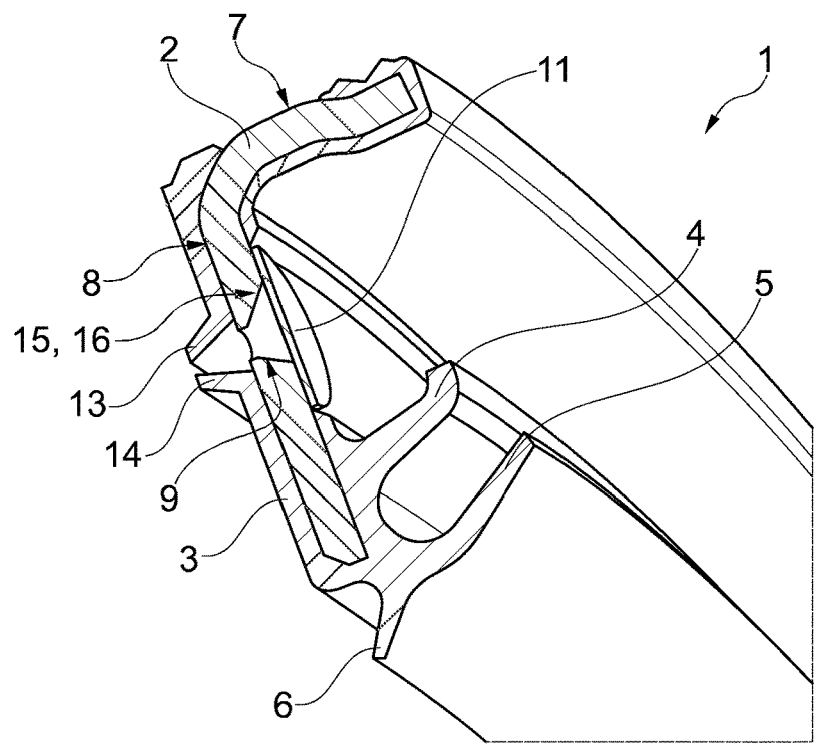

Just like FIG. 1, FIG. 2 depicts a section of a sealing arrangement 1 according to the disclosure of a wheel bearing that is not shown in detail. In this embodiment, aperture 9 is implemented in a different way.

Aperture 9 is created by use of a bore hole 15 with a chamfer 16. The diameter of bore hole 15 may increase in the direction of diaphragm 11. This causes an increase of the active surface of diaphragm 11.

LIST OF REFERENCE SIGNS

1 Sealing arrangement
2 Carrier element
3 Elastic element
4 Sealing lip
5 Sealing lip
6 Sealing lip
7 First section
8 Second section
9 Aperture
10 Bore hole
11 Diaphragm
12 Depression
13 Protective lip
14 Protective lip
15 Bore hole
16 Chamfer

The invention claimed is:

1. A sealing arrangement of a wheel bearing having an inner bearing part and an outer bearing part, between which rolling bodies are guided, wherein the sealing arrangement comprises:
a carrier element arranged to be connected to one of the inner bearing part or the outer bearing part, and an elastic element is provided on the carrier element, wherein the elastic element includes at least one sealing lip; and
wherein the carrier element features at least one aperture, and wherein the at least one aperture is sealed on one side by a diaphragm connected to the carrier element, wherein at least one protective lip is formed by the elastic element and the at least one protective lip surrounds the aperture, wherein the at least one protective lip is positioned on a side of the aperture that is opposite to the side of the aperture sealed by the diaphragm.

2. The sealing arrangement of claim 1, wherein the at least one aperture includes a chamfer.

3. The sealing arrangement of claim 1, wherein the at least one aperture is drilled, punched, milled, or lasered.

4. The sealing arrangement of claim 1, wherein the carrier element is manufactured out of a metal or plastic material.

5. The sealing arrangement of claim 1, wherein an air volume is provided between the diaphragm and the carrier element.

6. A sealing arrangement, comprising:
a carrier element arranged to be connected to a first bearing part; and
an elastic element that includes a sealing lip and two protective lips,
wherein the carrier element includes at least one aperture and the elastic element is attached to the carrier element,
wherein the at least one aperture is sealed on one side by a diaphragm connected to the carrier element,
wherein the two protective lips are provided on an opposite side of the carrier element than the diaphragm.

7. The sealing arrangement of claim 6, wherein the aperture is created by using a bore hole that includes a chamfer.

8. The sealing arrangement of claim 7, wherein a diameter of the bore hole increases in a direction toward the diaphragm.

9. The sealing arrangement of claim 6 wherein the at least one aperture includes a chamfer.

10. The sealing arrangement of claim 6, wherein both of the two protective lips are arranged in a V-shape formation.

11. The sealing arrangement of claim 6, wherein the at least one aperture includes a plurality of apertures evenly distributed along a circumference of the carrier element.

12. A sealing arrangement, comprising:
a carrier element arranged to be connected to a first bearing part, wherein the carrier element further includes an elastic element that includes at least two sealing lips,
wherein the carrier element includes at least one aperture, wherein the at least one aperture is sealed on one side by a diaphragm connected to the carrier element, and wherein at least one protective lip is formed by the elastic element and the at least one protective lip surrounds the aperture, wherein the at one least protective lip is positioned on a side of the aperture that is opposite to the side of the aperture sealed by the diaphragm.

13. The sealing arrangement of claim 12, wherein the carrier element is formed in an L-shape.

* * * * *